United States Patent
Meerbeek et al.

(12) 
(10) Patent No.: US 12,243,280 B2
(45) Date of Patent: Mar. 4, 2025

(54) DETERMINING AN IMAGE ANALYSIS REGION FOR ENTERTAINMENT LIGHTING BASED ON A DISTANCE METRIC

(71) Applicant: SIGNIFY HOLDING B.V., Eindhoven (NL)

(72) Inventors: Berent Willem Meerbeek, Veldhoven (NL); Dzmitry Viktorovich Aliakseyeu, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 145 days.

(21) Appl. No.: 17/924,368

(22) PCT Filed: May 20, 2021

(86) PCT No.: PCT/EP2021/063419
§ 371 (c)(1),
(2) Date: Nov. 10, 2022

(87) PCT Pub. No.: WO2021/239560
PCT Pub. Date: Dec. 2, 2021

(65) Prior Publication Data
US 2023/0360352 A1    Nov. 9, 2023

(30) Foreign Application Priority Data
May 25, 2020    (EP) .................................... 20176239

(51) Int. Cl.
*G06V 10/141*    (2022.01)
*G06T 7/62*    (2017.01)
(Continued)

(52) U.S. Cl.
CPC .............. *G06V 10/141* (2022.01); *G06T 7/62* (2017.01); *G06V 10/56* (2022.01); *G06V 10/60* (2022.01);
(Continued)

(58) Field of Classification Search
CPC ...... G06V 10/141; G06V 10/56; G06V 10/60; G06T 7/62; G06T 2207/10024;
(Continued)

(56) References Cited

U.S. PATENT DOCUMENTS

2009/0225065 A1    9/2009  Overes
2010/0020251 A1*   1/2010  Kadijk .................. H05B 47/155
                                                                    348/836
(Continued)

FOREIGN PATENT DOCUMENTS

WO    2018206378 A1    11/2018
WO    2018228883 A1    12/2018
(Continued)

*Primary Examiner* — Kyu Chae

(57) ABSTRACT

A system for controlling a light source based on an analysis of image content (101) in an analysis region (131-141) of the image content while a display displays the image content is configured to obtain the image content, obtain a distance between the light source and a surface, determine a size and/or location for the analysis region based on the distance, determine a characteristic of the image content by analyzing the image content in the analysis region, determine a light effect based on the characteristic, and control the light source to render the light effect.

14 Claims, 9 Drawing Sheets

(51) Int. Cl.
*G06V 10/56* (2022.01)
*G06V 10/60* (2022.01)
*H04N 5/66* (2006.01)

(52) U.S. Cl.
CPC ..... *H04N 5/66* (2013.01); *G06T 2207/10024* (2013.01); *G06T 2207/10048* (2013.01)

(58) Field of Classification Search
CPC ................ G06T 2207/10048; H04N 5/66; Y02B 20/40; H05B 45/20; H05B 47/155; H05B 47/165; H05B 47/125
See application file for complete search history.

(56) References Cited

U.S. PATENT DOCUMENTS

| | | |
|---|---|---|
| 2010/0026707 A1 | 2/2010 | Hoogenstraaten et al. |
| 2010/0097408 A1 | 4/2010 | Michael Marcellinus |
| 2011/0221963 A1* | 9/2011 | Bruyneel ................ H04N 5/66 |
| | | 348/553 |
| 2013/0147395 A1 | 6/2013 | Cook |
| 2016/0014864 A1 | 1/2016 | Aliakseyeu et al. |
| 2018/0279440 A1* | 9/2018 | Van De Sluis .... H05B 47/1965 |
| 2019/0036721 A1 | 1/2019 | Pognant et al. |
| 2020/0029411 A1 | 1/2020 | Barna et al. |

FOREIGN PATENT DOCUMENTS

| | | |
|---|---|---|
| WO | 2020089150 A1 | 5/2020 |
| WO | 2021089475 A1 | 5/2021 |

* cited by examiner

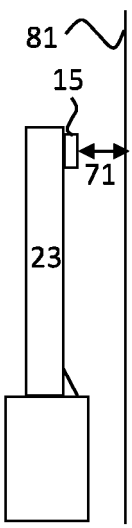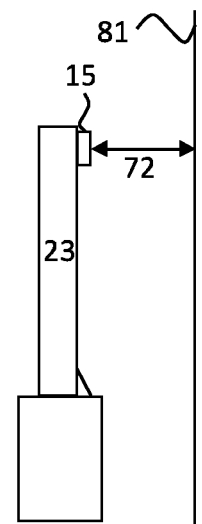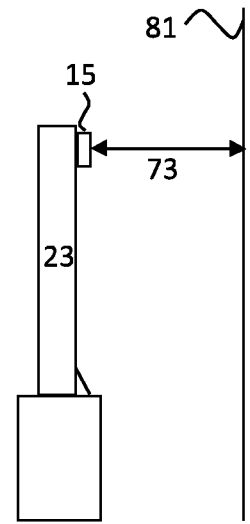
Fig. 3          Fig. 4          Fig. 5
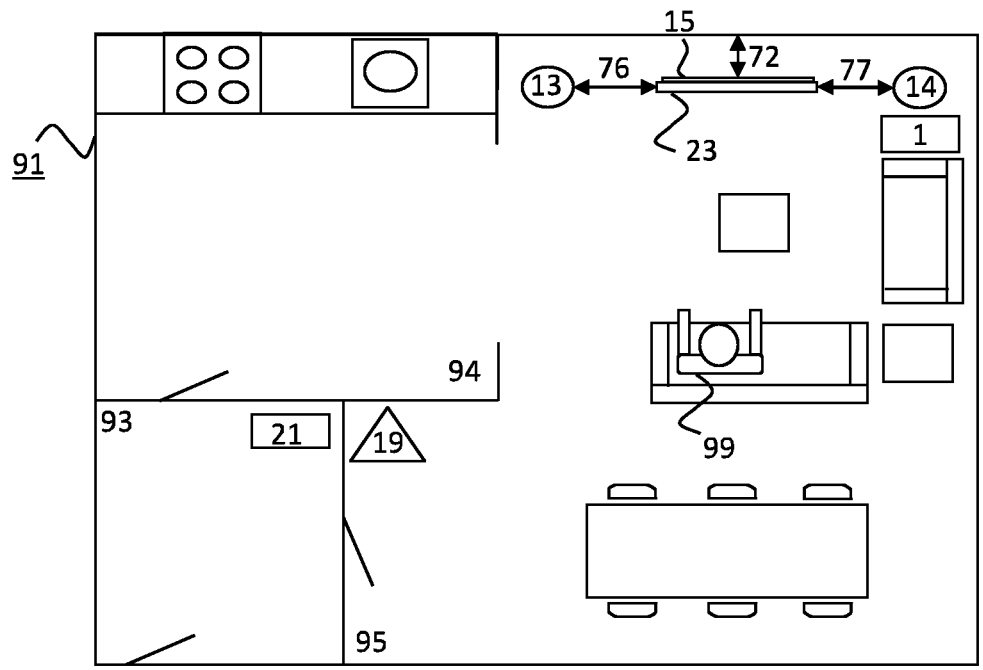
Fig. 6

DETERMINING AN IMAGE ANALYSIS REGION FOR ENTERTAINMENT LIGHTING BASED ON A DISTANCE METRIC

CROSS-REFERENCE TO PRIOR APPLICATIONS

This application is the U.S. National Phase application under 35 U.S.C. § 371 of International Application No. PCT/EP2021/063419, filed on May 20, 2021, which claims the benefit of European patent application Ser. No. 20/176, 239.0, filed on May 25, 2020. These applications are hereby incorporated by reference herein.

FIELD OF THE INVENTION

The invention relates to a system for controlling a light source based on an analysis of image content in an analysis region of said image content while a display displays said image content.

The invention further relates to a method of controlling a light source based on an analysis of image content in an analysis region of said image content while a display displays said image content.

The invention also relates to a computer program product enabling a computer system to perform such a method.

BACKGROUND OF THE INVENTION

The Philips HueSync application for Window PCs and Apple computers brings the atmosphere of a game, music or a movie right into the room with the user. When the application is active, selected lights will play light effects to accompany the content. A new product called the HDMI Sync box, an HDMI module, has recently been added to the Hue entertainment portfolio. This new device does not require a computer and is intended for use with streaming and gaming devices connected to the TV.

A pixelated light strip may be mounted around a TV to create an immersive experience, such as the experience created by the TV described in US 2010/0097408 A1. One of the key issues with a pixelated strip around the TV is that TVs are typically placed at different distances before a surface by different consumers. The surface may be a wall or another surface on which the light is projected, e.g. the backside of a cabinet in which the TV has been placed.

For example, some consumers may mount the TV directly to the wall, while others may put it on a TV cabinet or table at 10-20 cm from the wall. Although US 2010/0097408 A1 discloses changing the angle position of the pixelated light sources in the TV based on a distance to a wall, there is still a large difference between the quality of the entertainment light effects when the TV is near the wall and the quality of the entertainment light effects when the TV is farther away from the wall.

Document WO2020/089150A1 discloses a system for determining one or more light effects based on an analysis of video content. Thereby, a selected color extraction method is applied to extract a color from one or more frames of said video content. Light effects based on said extracted color are subsequently rendered on a light source.

SUMMARY OF THE INVENTION

It is a first object of the invention to provide a system, which is able to control a light source to render entertainment light effects whose quality is less dependent on the distance between the light source and a surface.

It is a second object of the invention to provide a method, which can be used to control a light source to render entertainment light effects whose quality is less dependent on the distance between the light source and a surface.

In a first aspect of the invention, a system for controlling a light source based on an analysis of image content in an analysis region of said image content while a display displays said image content, comprises at least one input interface, at least one output interface, and at least one processor configured to obtain said image content via said at least one input interface, obtain a distance between said light source and a surface, determine a size and/or location for said analysis region based on said distance, determine a characteristic of said image content by analyzing said image content in said analysis region, determine a a light effect based on said characteristic, and control, via said at least one output interface, said light source to render said light effect onto the surface. The light effect may comprise a color and/or intensity.

Said characteristic may comprise or be e.g. be a color, e.g. a pixel value, and/or e.g. an intensity. Said characteristic may e.g. be a color throughout the application, wherein said color may be determined by analyzing said image content in said analysis region, i.e. e.g. with a color extraction methodology.

When the light source is placed relatively far from the surface (e.g. a wall), the blending of light from different light sources of a pixelated lighting device, also referred to as pixels, will happen automatically by optical mixing. The larger the distance between the light source/pixel and the surface, the more the light emitted by the light sources/pixels will blend. At a short distance, there will be hardly any blending between the pixels. User perception tests have shown that users find the entertainment light effects to be of lesser quality when blending does not take place. For this reason, an algorithmic way of blending the colors from the pixels is used which depends on the distance between the light source and the surface. This distance may be obtained from a sensor or from a user device, for example. In the latter case, the distance is determined from user input. The user device may be a user input device, for example. The location of the analysis region may be the center of mass of the analysis region or the location of one or more of the corners, for example. The image content is typically video content. Hence, the system according to the invention may comprise the sensor or the user device. In aspects, the light source may comprise the sensor or the user device (such as a user input device or user interface device).

Said at least one processor may be configured to determine a first analysis region with a first size and a first location when said distance has a first value and a second analysis region with a second size and a second location when said distance has a second value, said second size being different than said first size and/or said second location being different than said first location, said first analysis region having a larger overlap with adjacent analysis regions than said second analysis region and said first value being smaller than said second value. Thus, as the distance between the light source/pixel and the surface gets smaller, the overlap between adjacent analysis regions increases to blend the light effects determined from the analysis regions, e.g. blend the colors extracted from the analysis regions, to a higher degree. Overlap between analysis regions may be increased by increasing the size of one or more of the analysis regions, for example.

In aspects, the size according to the invention may be predefined or constant, whereas the location may be determined based on said distance. In aspects, the location according to the invention may be predefined or constant, whereas the size may be determined based on said distance.

In aspects, throughout the application, but phrased alternatively, the processor according to the invention may be configured to determine an image analysis property for said analysis region based on said distance, wherein the image analysis property may comprise a size and/or a location for said analysis region. Hence, the size and/or location may be defined as an image analysis property.

Said light source may be comprised in a lighting device, said lighting device may comprise a further light source, said distance may also represent a distance between said further light source and said surface, and said at least one processor may be configured to determine a size and/or location for a further analysis region of said image content based on said distance, determine a further characteristic of said image content by analyzing said image content in said further analysis region, determine a further light effect based on said further characteristic, and control said further light source to render said further light effect. Hence, said distance may in examples be the distance between the lighting device and said surface; this may be considered a device distance in examples. The further light effect may comprise a color and/or intensity. Said further characteristic may e.g. comprise or be a color, e.g. a pixel value, and/or e.g. an intensity.

Often, the lighting device is placed such that the distance between each light source and the surface is the same for all light sources of the lighting device and making an assumption that the distance between multiple, e.g. all, light sources of the lighting device and the surface are the same therefore works in many situations. If the distances between the light sources and the surface are not the same but differ slightly, this assumption will usually still result in high quality entertainment light effects.

Said at least one processor may be configured to obtain a device distance between said lighting device and said surface, obtain a further device distance between said lighting device and said surface, and determine said distance by calculating an average of said device distance and said further device distance. This is beneficial if multiple device distances are obtained, e.g. the distances between the two edges of a lighting device and the surface.

Said light source may be comprised in a lighting device, said lighting device may comprise a further light source, and said at least one processor may be configured to obtain a further distance between said further light source and said surface, determine a size and/or location for a further analysis region of said image content based on said further distance, determine a further characteristic of said image content by analyzing said image content in said further analysis region, determine a further light effect based on said further characteristic, and control said further light source to render said further light effect. The further light effect may comprise a color and/or intensity. Said further characteristic may e.g. comprise or be a color, e.g. a pixel value, and/or e.g. an intensity. Determining different distances for different light sources of the same lighting device is beneficial if there is a substantial difference between the distances between the light sources and the surface. This may be the case when a lighting device that comprises vertically arranged light sources is placed leaning against a wall or when a light strip is attached horizontally to a curved display or display placed in a corner, for example, Said at least one processor may be configured to obtain a device distance between said lighting device and said surface, obtain a further device distance between said lighting device and said surface, determine said distance between said light source and said surface based on said device distance, said further device distance and a position of said light source on said lighting device, and determine said further distance between said further light source and said surface based on said device distance, said further device distance and a position of said further light source on said lighting device. If a distance between a light source and the surface is not obtained for each light source, it is still possible to determine a relatively accurate distance to the surface for each light source based on the (e.g. two) device distances that have been obtained.

Said at least one processor may be configured to estimate an amount of light overlap between light projected on said surface by said light source and light projected on said surface by said further light source based on said distance, determine an amount of desired region overlap between said analysis region and said further analysis region based on said estimated amount of light overlap, and determine said size and/or location for said analysis region and said size and/or location for said further analysis region based on said amount of desired region overlap. This may be beneficial, for example, if the user is able to change the angle of the light sources. If the user is not able to change the angle of the light sources, it is also possible to use predetermined mappings between distance and desired region overlap or between distance and analysis region size and/or location.

Said at least one processor may be configured to determine said size and/or location for said analysis region further based on a size of said light source, a size of said display, and/or a size of a lighting device comprising said light source. As a first example, the formula $C=p+b/(0.1*d+1)$ may be used to calculate the size of the analysis region for a (e.g. LED) pixel in centimeters when d is smaller than a certain threshold T, C being the size of the analysis region in centimeters, b being a blending factor, d being an (estimated or measured) numeric distance value in centimeters and p being the size of the pixel in centimeters. In this example, a minimum analysis region size is used when d is greater than or equal to threshold T.

As a second example, a mapping table may be used, where the percentage of overlap is given for multiple ranges of distances to the surface. For example, a distance between 0 and 5 cm may be mapped to an overlap percentage of 50%, a distance between 5 and 10 cm may be mapped to an overlap percentage of 25%, etc. The size of the analysis region may then be determined based on the size of the pixel and the determined overlap percentage.

The ratio between pixel (light source) size and display size may further be used as parameter. For instance, the above-mentioned formula may be modified such that C is a function of p (size of a pixel), d (distance to the surface) and r (ratio between display size and pixel size). In a first implementation, the larger the size of the pixel relative to the size of the display, the smaller the overlap percentage. For example, with a distance of 5 cm to a wall, for a TV with a 55-inch display (55 inch being the diagonal dimension), the overlap between adjacent analysis regions might be 40% for a 6.25 cm pixel and 20% for a 12.5 cm pixel and for a TV with a 75-inch display, the overlap between adjacent analysis regions might be 50% for a 6.25 cm pixel and 25% for a 12.5 cm pixel. Said at least one processor may be configured to determine said size and/or location for said analysis region further based on a distance between said light source and said display. For example, the entertainment light effects may look better if a larger analysis region is used when the distance between the light source and the display is larger.

Said light source may comprise a plurality of light elements which are not able to render different light effects. In other words, if these light elements render a light effect, they render the same light effect. A pixelated lighting device often comprises a plurality of such light sources. In a pixelated lighting device, the light source is also referred to as a pixel or a segment. The light element may be a LED, for example.

In a second aspect of the invention, a method of controlling a light source based on an analysis of image content in an analysis region of said image content while a display displays said image content comprises obtaining said image content, obtaining a distance between said light source and a surface, determining a size and/or location for said analysis region based on said distance, determining a characteristic of said image content by analyzing said image content in said analysis region, determining a light effect based on said characteristic, and controlling said light source to render said light effect onto the surface. Said method may be performed by software running on a programmable device. The light effect may comprise a color and/or intensity. This software may be provided as a computer program product. Said characteristic may e.g. comprise or be a color, e.g. a pixel value, and/or e.g. an intensity.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for controlling a light source based on an analysis of image content in an analysis region of said image content while a display displays said image content.

The executable operations comprise obtaining said image content, obtaining a distance between said light source and a surface, determining a size and/or location for said analysis region based on said distance, determining a characteristic of said image content by analyzing said image content in said analysis region, determining a light effect based on said characteristic, and controlling said light source to render said light effect onto the surface. The light effect may comprise a color and/or intensity. Said characteristic may e.g. comprise or be a color, e.g. a pixel value, and/or e.g. an intensity.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which:

FIG. 3 shows an example of a lighting device with a first distance to a wall;

FIG. 4 shows an example of a lighting device with a second distance to a wall;

FIG. 5 shows an example of a lighting device with a third distance to a wall;

FIG. 6 shows an example of a floorplan of a home in which the system of FIG. 1 may be used;

Corresponding elements in the drawings are denoted by the same reference numeral.

DETAILED DESCRIPTION OF THE EMBODIMENTS

Figure 1:
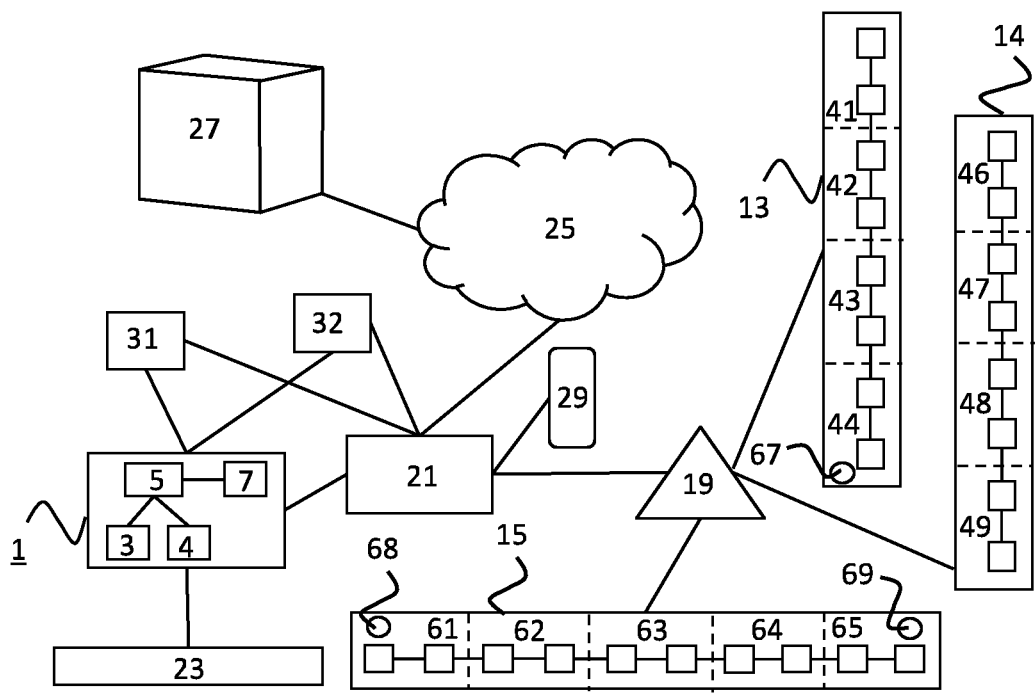
FIG. 1 is a block diagram of a first embodiment of the system.

FIG. 1 shows a first embodiment of the system for controlling a light source based on an analysis of image content in an analysis region of the image content while a display displays the image content: an HDMI module 1. The HDMI module 1 may be a Hue Play HDMI Sync Box, for example. In the example of FIG. 1, the image content is rendered on a display 23. Alternatively, the image content may be rendered on multiple displays, e.g. a video wall.

In the example of FIG. 1, The HDMI module 1 can control the lighting devices 13-15 via a bridge 19. The bridge 19 may be a Hue bridge, for example. The bridge 19 communicates with the lighting devices 13-15, e.g. using Zigbee technology. The HDMI module 1 is connected to a wireless LAN access point 21, e.g. via Wi-Fi. The bridge 19 is also connected to the wireless LAN access point 21, e.g. via Wi-Fi or Ethernet.

Alternatively or additionally, the HDMI module 1 may be able to communicate directly with the bridge 19, e.g. using Zigbee technology, and/or may be able to communicate with the bridge 19 via the Internet/cloud. Alternatively or additionally, the HDMI module 1 may be able to control the lighting devices 13-15 without a bridge, e.g. directly via Wi-Fi, Bluetooth or Zigbee or via the Internet/cloud.

The wireless LAN access point 21 is connected to the Internet 25. A media server 27 is also connected to the Internet 25. Media server 27 may be a server of a video-on-demand service such as Netflix, Amazon Prime Video, Hulu, Disney+ or Apple TV+, for example. The HDMI module 1 is connected to the display 23 and local media receivers 31 and 32 via HDMI. The local media receivers 31 and 32 may comprise one or more streaming or content generation devices, e.g. an Apple TV, Microsoft Xbox One and/or Sony PlayStation 4, and/or one or more cable or satellite TV receivers.

In the example of FIG. 1, the lighting devices 13 and 14 are vertically arranged arrays of light sources, like e.g. the Philips Hue Signe, and the lighting device 15 is a horizontally arranged array of light sources, e.g. a horizontally placed light strip. The lighting device 13 comprises four light sources (pixels) 41-44 and one distance sensor 67, the lighting device 14 comprises four light sources (pixels) 46-49 and no distance sensor, and the lighting device 15 comprises five light sources (pixels) 61-65 and two distance sensors 68 and 69. The distance sensors 67-69 may comprise one or more infrared distance sensors and/or one or more ultrasonic distance sensors, for example.

The lighting devices 13-15 are also referred to as pixelated lighting devices. In practice, a pixelated lighting device comprises more than four or five pixels. In the example of FIG. 1, each light source (pixel) comprises two light elements, e.g. LEDs, which are not able to render light effects that are not the same. Light sources 41-44, 46-49, and 61-65 are also referred to as individually addressable segments of light elements.

The HDMI module 1 comprises a receiver 3, a transmitter 4, a processor 5, and memory 7. The processor 5 is configured to obtain video content via the receiver 3, e.g. from media receiver 31 or 32, obtain a distance between the light sources of each lighting device and a surface, e.g. from one or more of sensors 67-69 or from a user device 29, and determine, for each light source, a size and/or location for an analysis region associated with the light source based on the distance. User device 29 may be a mobile phone or a tablet, for example.

The processor 5 is further configured to determine a characteristic of the video content by analyzing the video content in the analysis region, determine a color and/or intensity for a light effect based on the characteristic, and control, via the transmitter 4, the light sources 41-44, 46-49, and 61-65 to render the light effects. Said characteristic may e.g. comprise or be a color, e.g. a pixel value, and/or e.g. an intensity.

In the example of FIG. 1, a distance between the light sources and a surface is known for each for each of lighting devices 13-15 and the analysis regions can therefore be determined based on these distances. Analysis regions with distance-independent sizes and locations may be used for light sources of which no distance between the light sources and a surface is known.

In the example of FIG. 1, two device distances are obtained from the lighting device 15 and one device distance is obtained from the lighting device 13. A device distance is a distance between the lighting device and a surface on which the light is projected, e.g. a wall. A second device distance may be obtained for lighting device 13 from user device 29. Alternatively, the single device distance obtained from the lighting device 13 may be considered to represent the distance between all light sources of the lighting device 13 and the surface, or, if the top of the lighting device 13 is intended to lean against the surface, a second device distance may be determined to be zero. One or more device distances for lighting device 14 are obtained from the user device 29.

If only a single device distance is obtained for a lighting device, the distance between the surface and each light source of the lighting device is assumed to be this single device distance. If multiple device distances are obtained for a lighting device, the distance between the surface and each light source of the lighting device may be an average of the device distances or the distance between a light source and the surface may be determined based on the device distances and the position of the light source on the lighting device.

As an example of the former, if the distance sensor 68 measures a distance of 30 cm and the distance sensor 69 measures a distance of 50 cm, the distance between the surface and each light source of lighting device 15 may be considered to be 40 cm. As an example of the latter, if the distance sensor 68 measures a distance of 30 cm and the distance sensor 69 measures a distance of 50 cm, the distance between light sources 61-65 and the surface may be considered to be 30, 35, 40, 45, and 50 cm, respectively.

If the distance between each light source of a lighting device and the surface is assumed to be the same, then it is not necessary to determine a distance per light source after determining the (average) device distance. The processor 5 may then determine the sizes and/or locations for the analysis regions directly based on the (average) device distance.

In the embodiment of the HDMI module 1 shown in FIG. 1, the HDMI module 1 comprises one processor 5. In an alternative embodiment, the HDMI module 1 comprises multiple processors. The processor 5 of the HDMI module 1 may be a general-purpose processor, e.g. ARM-based, or an application-specific processor. The processor 5 of the HDMI module 1 may run a Unix-based operating system for example. The memory 7 may comprise one or more memory units. The memory 7 may comprise solid-state memory, for example.

The receiver 3 and the transmitter 4 may use one or more wired or wireless communication technologies such as Zigbee to communicate with the bridge 19 and HDMI to communicate with the display 23 and with local media receivers 31 and 32, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The HDMI module 1 may comprise other components typical for a network device such as a power connector. The invention may be implemented using a computer program running on one or more processors.

In the embodiment of FIG. 1, the system of the invention is an HDMI module. In an alternative embodiment, the system may be another device, e.g. a mobile device, laptop, personal computer, a bridge, a media rendering device, a streaming device, or an Internet server. In the embodiment of FIG. 1, the system of the invention comprises a single device. In an alternative embodiment, the system comprises multiple devices.

The analysis of the video content may be performed in real-time, i.e. just before the light sources are controlled and the video content is displayed. Alternatively, the analysis of the video content may be performed earlier, e.g. by using automatic light scripting. Automatic light scripting may be performed by the above-mentioned Internet server, for example. In automatic light scripting, analysis of the video content is done prior to the user watching/streaming it (it could also be done near real-time with e.g. a buffer of 5 minutes), typically in the cloud. This may be used to ensure a perfect synchronization between content and light effects.

A processing system running in the cloud could use a user profile, indicating the distance to the surface amongst others, to generate a personalized script. Alternatively, the system might pre-generate a set of scripts for a few common distances (e.g. 0-5 cm, 5-10 cm and more than 10 cm), and when the user starts streaming a movie, the system could then choose the script that is closest to the user's setup. The latter will save resources in the cloud when popular movies are streamed.

Figure 2:
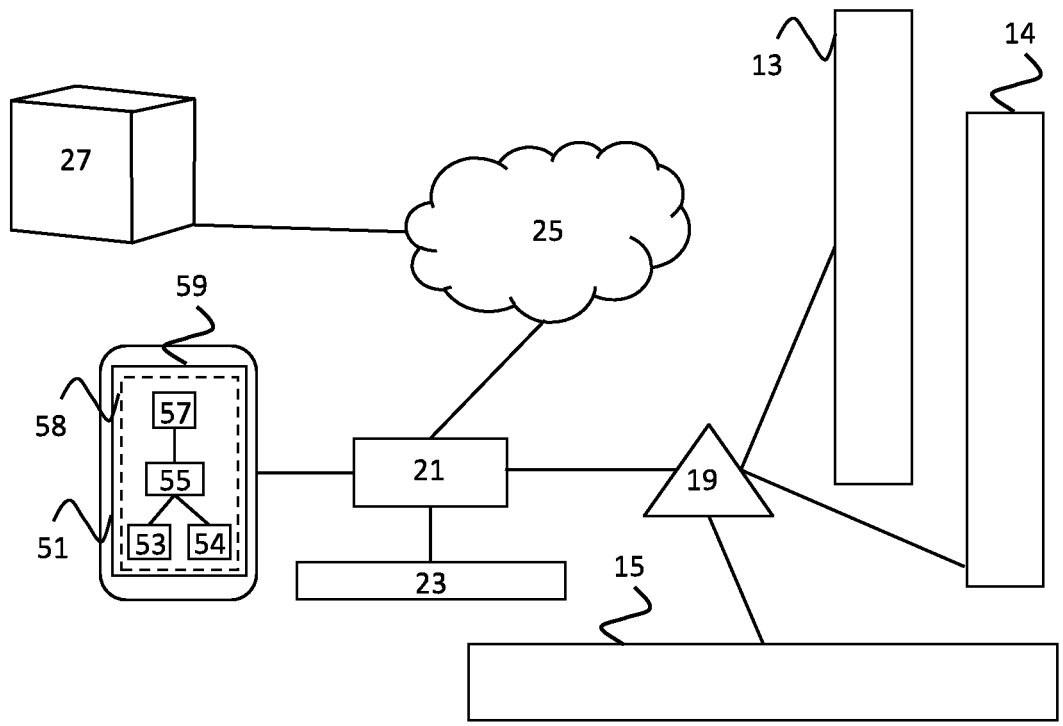
FIG. 2 is a block diagram of a second embodiment of the system.

FIG. 2 shows a second embodiment of the system for controlling a light source based on an analysis of image content in an analysis region of the image content while a display displays the image content: a mobile device 51. The mobile device 51 may be a smart phone or a tablet, for example. The lighting devices 13-15 can be controlled by the mobile device 51 via the bridge 19. The mobile device 51 is connected to the wireless LAN access point 21, e.g. via Wi-Fi.

The mobile device 51 comprises a receiver 53 a transmitter 54, a processor 55, a memory 57, and a display 59. The image content is preferably displayed on the external display 23 but could also be displayed on display 59 of the mobile device 51. The processor 55 is configured to obtain video content via the receiver 53, e.g. from the media server 27, and obtain a distance between the light sources of each lighting device and a surface, e.g. from one or more of sensors 67-69, see FIG. 1, or from an input interface (e.g. a touchscreen display or a microphone) of the mobile device 51 itself, The processor 55 is further configured to determine, for each light source, a size and/or location for an analysis region associated with the light source based on the distance, determine a characteristic of the video content by analyzing the video content in the analysis region, determine a color and/or intensity for a light effect based on the characteristic, and control, via the transmitter 54, the light sources 41-44, 46-49, and 61-65 to render the light effects. Alternatively, said "determine a color and/or intensity for a light effect" may be phrased as "determine a light effect", wherein said light effect may comprise a color and/or intensity.

In the embodiment of the mobile device 51 shown in FIG. 2, the mobile device 51 comprises one processor 55. In an alternative embodiment, the mobile device 51 comprises multiple processors. The processor 55 of the mobile device 51 may be a general-purpose processor, e.g. from ARM or Qualcomm or an application-specific processor. The processor 55 of the mobile device 51 may run an Android or iOS operating system for example. The display 59 may be a touchscreen display, for example. The display 59 may comprise an LCD or OLED display panel, for example. The memory 57 may comprise one or more memory units. The memory 57 may comprise solid state memory, for example.

The receiver 53 and the transmitter 54 may use one or more wireless communication technologies such as Wi-Fi (IEEE 802.11) to communicate with the wireless LAN access point 21, for example. In an alternative embodiment, multiple receivers and/or multiple transmitters are used instead of a single receiver and a single transmitter. In the embodiment shown in FIG. 2, a separate receiver and a separate transmitter are used. In an alternative embodiment, the receiver 53 and the transmitter 54 are combined into a transceiver. The mobile device 51 may further comprise a camera (not shown). This camera may comprise a CMOS or CCD sensor, for example. The mobile device 51 may comprise other components typical for a mobile device such as a battery and a power connector. The invention may be implemented using a computer program running on one or more processors.

In the embodiment of FIG. 2, the lighting devices 13-15 are controlled via the bridge 19. In an alternative embodiment, one or more of the lighting devices 13-15 is controlled without a bridge, e.g. directly via Bluetooth. In the embodiment of FIGS. 1 and 2, the system of the invention comprises only local devices. In an alternative embodiment, the system of the invention comprises one or more Internet/cloud servers.

FIG. 3 shows an example of the lighting device 15 of FIGS. 1 and 2 having a first distance 71 to a wall 81. The lighting device 15 has been attached to the back of display 23 of FIG. 1. FIG. 4 shows an example of the lighting device 15 having a second distance 72 to the wall 81. FIG. 5 shows an example of the lighting device 15 having a third distance 73 to the wall 81. The first distance 71 is shorter than the second distance 72. The second distance 72 is shorter than the third distance 73.

FIG. 6 depicts an example of a space in which the system of FIG. 1 is used. A floor 91 of a home comprises a hallway 93, a kitchen 94 and a living room 95. Lighting devices 13-15 have been installed in the living room 65. Vertically arranged lighting devices 13 and 14 have been placed on respectively the left and right side of the display 23, which may be a TV, for example. Horizontally arranged lighting device 15 has been attached to the back of display 23.

The wireless LAN access point 21 has been installed in the hallway 93. The HDMI module 1 has been installed next to the display 23 in the living room 65. The bridge 19 has been installed in the living room 65 near the wireless LAN access point 21. A person 99 is watching TV. The lighting device 15 has a second distance 72 to the wall, as shown in FIG. 4. The lighting device 13 has distance 76 to the display 23. The lighting device 14 has a distance 77 to the display 23.

Figure 7:
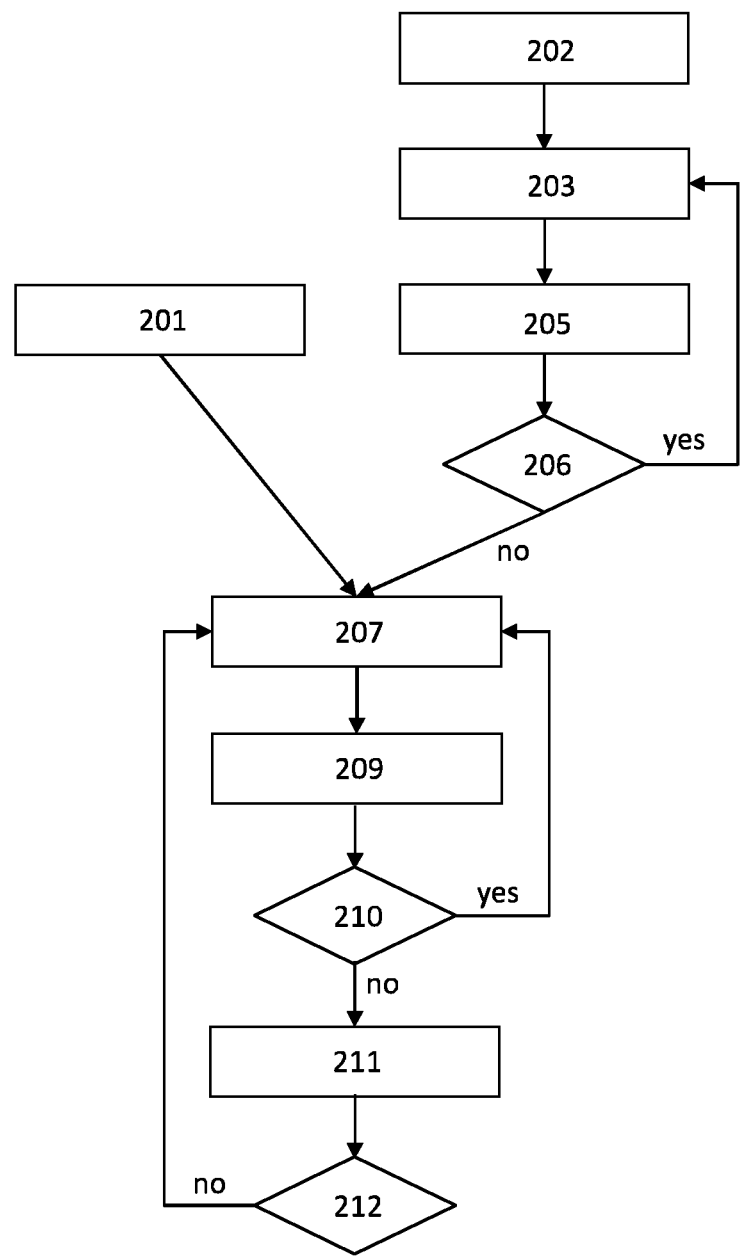
FIG. 7 is a flow diagram of a first embodiment of the method.

A first embodiment of the method of controlling a light source based on an analysis of image content in an analysis region of the image content while a display displays the image content is shown in FIG. 7. A step 201 comprises obtaining video content.

A step 202 comprises obtaining lighting device information relating to the lighting devices. The lighting device information may comprise, per lighting device, the width of a horizontally arranged lighting device or the height of a vertically arranged lighting device and the size of the light sources/pixels, for example.

The lighting device information relating to a certain lighting device may be obtained, for example, when a user adds this lighting device to his lighting system. For example, when a new lighting device is added, an HDMI module, mobile device or bridge may download the lighting device information from the lighting device and store it. When this information is stored on a bridge, an HDMI module or mobile device may be able to later obtain this information from the bridge.

In a simpler embodiment, step 202 may be omitted. In a more advanced embodiment, the lighting device information may comprise further information about the lighting device, for example the pixel density (e.g. number of light pixels per meter), the pixel spacing (e.g. the distances between the centers of two individual pixels) and/or indicate optical properties of the pixels (e.g. the beam width and beam angle of the pixelated light sources).

A step 203 comprises obtaining a distance between each light source, i.e. each pixel, of the lighting device and a surface, e.g. a wall. Typically, one or more device distances are obtained from a sensor or from a user device. The distance between each light source of the lighting device and the surface may be the same. Alternatively, a different distance per light source may be determined based on the obtained one or more device distances.

The distance between the pixelated light sources and the to be illuminated area, i.e. the surface, can be determined in various ways. In a simple embodiment, the user provides input on the distance for example via a smart phone UI. This can be an input of a numeric value or an approximation e.g. by selecting an icon on how the TV is installed (wall-mount vs standing). In a more advanced embodiment, the distance between the light source and the to be illuminated area, i.e. the surface, is determined automatically via an external sensor, e.g. by using one or more sensors (e.g. time-of-flight sensors) embedded in or attached to the lighting device or by analyzing a (depth) image from the TV setup as captured by a smartphone camera.

A step 205 comprises determining, for each light source, a size and/or location for an analysis region associated with the light source based on the distance. A first analysis region with a first size and a first location is determined in step 205 for a first light source when the distance has a first value and a second analysis region with a second size and a second location is determined in step 205 for this first light source when the distance has a second value.

The first analysis region has a larger overlap with adjacent analysis regions than the second analysis region and the first value is smaller than the second value. The second size is different than the first size and/or the second location is different than the first location. Although it may be possible to create a larger overlap by only changing the location of at least one of the adjacent analysis regions, it may be easier to achieve this by (also) using a larger analysis region.

In the embodiment of FIG. 7, the formula C=p+b/(0.1*d+1) is used to calculate the size of the analysis region for a pixel in centimeters when d is smaller than a certain threshold T, C being the size of the analysis region in centimeters, b being a blending factor, d being an (estimated or measured) numeric distance value in centimeters and p being the size of the pixel in centimeters. A minimum analysis region size is used when d is greater than or equal to threshold T.

A pixel may comprise multiple light elements, e.g. multiple LEDs. A pixel of 6 centimeters may comprise, for example, 6 LED packages, one placed each centimeter of the lighting device (e.g. light strip). All 6 LEDs are controlled in one color. The 6 LEDs may comprise three RGB LEDs and three white LEDs, for example.

For example, for horizontally arranged pixels with a blending factor of 6, a pixel width of 6 cm and a distance of 50 cm to the wall, the width of a color analysis region could be calculated as follows: 6+6/(0.1*50+1)=7 cm. If the TV would be placed against the wall (0 cm), the width of the color analysis region would be 12 cm. This would mean that it would take 50% of both adjacent pixels. When put 10 cm from the wall, the color analysis region would be 9 cm wide (taking 25% of both adjacent pixels). In this example, the threshold T is larger than 50 cm. If the threshold T is lower than 50 cm and the distance is 50 cm to the wall, the width of the color analysis region would be determined to be 6 cm.

For vertically arranged pixels, the height of the color analysis region may be determined in the manner described above in relation to the width of color analysis region for horizontally arranged pixels.

The color analysis region size in pixels may be determined by multiplying the width of the color analysis region size in centimeters with the amount of horizontal pixels of the video content divided by the width of the horizontally arranged lighting device in centimeters or multiplying the height of the color analysis region size in centimeters with the amount of vertical pixels of the video content divided by the height of the vertically arranged lighting device in centimeters.

For horizontally arranged pixels, the height of the color analysis region may be determined independent of the distance to the wall, e.g. may be a fixed value, or may be determined based on the width of the color analysis region, for example. For vertically arranged pixels, the width of the color analysis region may be determined independent of the distance to the wall, e.g. may be a fixed value, or may be determined based on the height of the color analysis region, for example The horizontally and vertically arranged pixels may be part of light strips attached the display device or may be part of a lighting device located a bit farther from the display device, e.g. a floor standing luminaire like Hue Signe that is put near a wall and joins the entertainment experience.

In a variant on this embodiment, the ratio between pixel (light source) size and display size is further used as parameter. For instance, the above-mentioned formula may be modified such that C is a function of p (size of a pixel), d (distance to the surface) and r (ratio between display size and pixel size). In a first implementation, the larger the size of the pixel relative to the size of the display, the smaller the overlap percentage. For example, with a distance of 5 cm to a wall, for a TV with a 55-inch display (55 inch being the diagonal dimension), the overlap between adjacent analysis regions might be 40% for a 6.25 cm pixel and 20% for a 12.5 cm pixel and for a TV with a 75-inch display, the overlap between adjacent analysis regions might be 50% for a 6.25 cm pixel and 25% for a 12.5 cm pixel. Information indicating the display size may be obtained in step 202 or in a separate step performed before, after, or (partly) in parallel with step 202, for example.

In a simpler embodiment, the determination of the color analysis region size may be a simple binary decision. If the TV (with attached or embedded light sources) is mounted on a stand, the color analysis region is one-to-one mapped to the pixel. So, if a pixel is 6 cm wide, the color analysis region has a corresponding width. If the TV is mounted against the wall, the color analysis region is enlarged and takes 50% of the color analysis region of both adjacent pixels.

In a slightly less simple embodiment, a mapping table may be used, where the percentage of overlap is given for multiple ranges of distances to the surface. For example, a distance between 0 and 5 cm may be mapped to an overlap percentage of 50%, a distance between 5 and 10 cm may be mapped to an overlap percentage of 25%, etc. The size of the analysis region may then be determined based on the size of the pixel and the determined overlap percentage.

In a more advanced embodiment, a more complex function is used. Furthermore, the blend factor b may be variable and selected by a user or by the system, for example based on type of content.

A step 206 comprises checking whether there is a further lighting device to be controlled based on an analysis of video content for which the analysis region(s) have not been determined yet. If so, steps 203 and 205 are repeated for this further lighting device. If not, a step 207 is performed. Step 201 may be performed in parallel with at least part of one or more of steps 202-206, before step 202 is performed or between steps 206 and 207, for example.

Step 207 comprises determining a characteristic of the video content by analyzing the video content, typically a video frame of the video content, in an analysis region associated with one of the light sources. In the embodiment of FIG. 7, a color is extracted from the video content in the analysis region. Various color extraction methods can be used, such as taking the average or trimean color in this region. The color extraction method could also vary depending on the amount of overall and absolute size of the analysis regions. For example, for smaller regions with no overlap, taking the average might work best (a stable but desaturating method), while for larger overlapping regions, a trimean method might work best (resulting in less stable but more saturated colors).

If desired, the size and/or locations of the color analysis region determined in step 203 may be adjusted in step 207, e.g. based on color and/or brightness contrast and/or the number of edges in the content. For example, if a video frame contains high contrasting elements that are aligned with light pixels, the analysis regions could be reduced even in the case of a short distance to the wall. Similarly, if content is already very smooth, overlapping regions will not be beneficial and will only result in desaturation of the light effects. This analysis can be done per pixel and thereby allows an overlap to be reduced for some pixels and to be increased for other pixels. However, this will normally only be possible if the system can analyze the content fast enough, as it will need to be done every video frame.

A step 209 comprises determining a light effect to be rendered on this light source based on the characteristic. If a color is extracted in step 207, this color may be used as color for the light effect to be rendered on the light source.

A step 210 comprises checking whether there is a further light source that has been associated with an analysis region and for which no light effect has been determined yet. If so, steps 207 and 209 are repeated for this further light source. If not, a step 211 is performed. Step 211 comprises controlling the light sources to render the light effects determined in step 209 by transmitting a light control command specifying one of the light effects to a corresponding light source, either directly or to the lighting device that comprises the light source.

A step 212 comprises checking whether the end of the video content has been reached. If not, steps 207-211 are repeated for the next part, e.g. next frame, of the video content.

Figure 8:
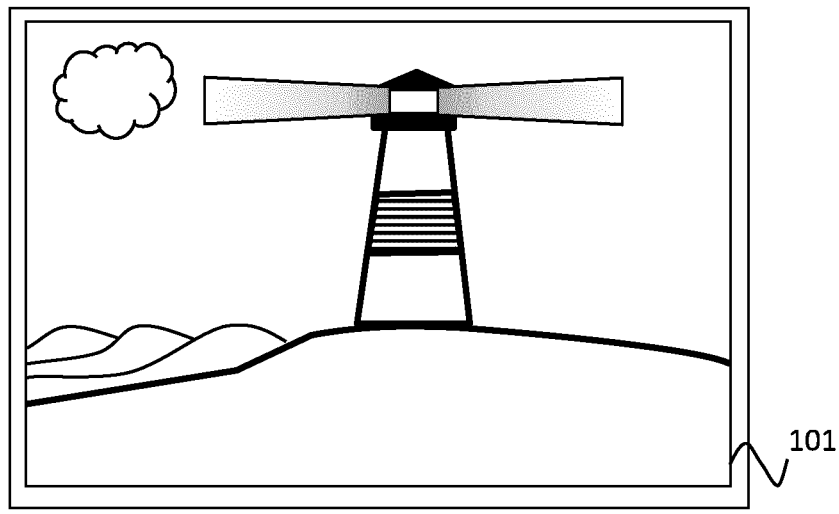
FIG. 8 shows an example of a video frame.
Figure 9:
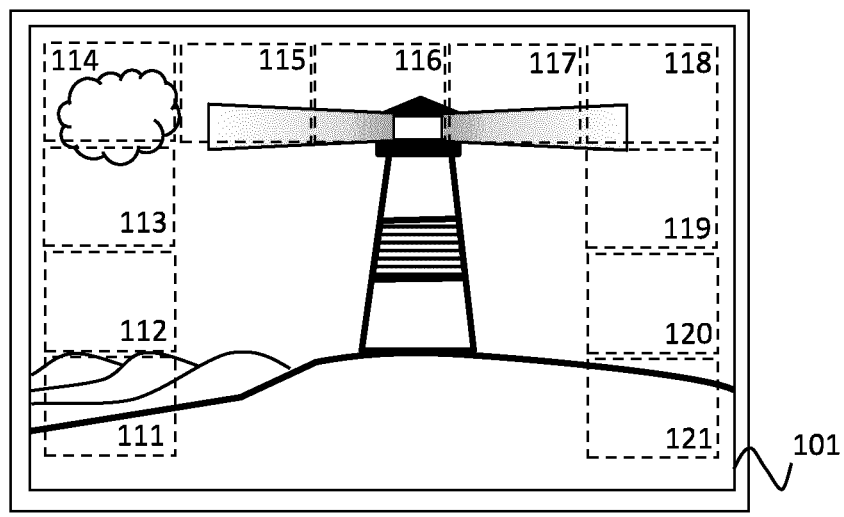
FIGS. 9-13 show examples of analysis areas used to analyze the video frame of FIG. 8.

FIG. 8 shows an example of a video frame 101 of the video content being rendered, e.g. on display 23 of FIG. 1. FIG. 9 shows examples of analysis regions 111-121 that may be used to extract characteristics from video frame 101. In this example, multiple regions of the screen are mapped to different lighting devices and each analysis region is analyzed separately, e.g. an average color is extracted from each analysis regions. For example, the analysis regions 111 to 114 may be mapped to pixels 41-44 of lighting device 13 of FIG. 1, the analysis regions 114 to 118 may be mapped to pixels 61-65 of lighting device of FIG. 1, and the analysis regions 118 to 121 may be mapped to pixels 46-49 of lighting device 14 of FIG. 1.

Figure 10:
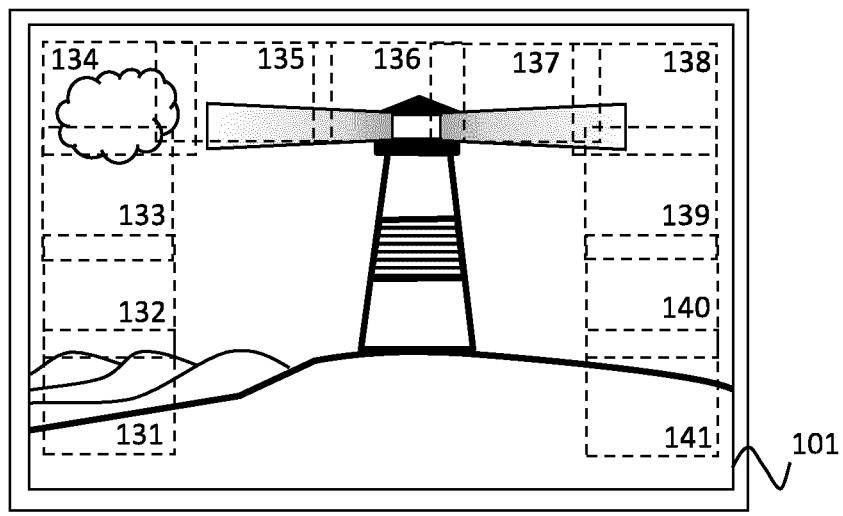

FIG. 10 shows further examples of analysis regions that may be used to extract characteristics from video frame 101. In this example, the analysis regions 131 to 134 may be mapped to pixels 41-44 of lighting device 13 of FIG. 1, the analysis regions 134 to 138 may be mapped to pixels 61-65 of lighting device 15 of FIG. 1, and the analysis regions 138 to 141 may be mapped to pixels 46-49 of lighting device 14 of FIG. 1.

The analysis regions 131-141 of FIG. 10 are larger than the analysis regions 111-121 of FIG. 9 and as a result, there is overlap between adjacent analysis regions in FIG. 10, while there is no such overlap between adjacent analysis regions in FIG. 9. Such an overlap is beneficial if the distance between the pixels of the pixelated lighting device and the surface, e.g. wall, is relatively small.

Figure 11:
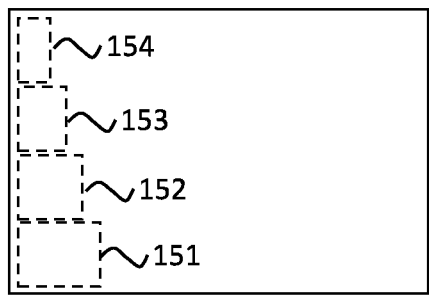

In the example of FIGS. 9 and 10, each analysis region has the same size. However, it is also possible to use differently sized analysis regions, as shown in FIG. 11. Of the analysis regions 151-154 at the left side of the video frame, analysis region 151 is largest and analysis region 154 is smallest.

FIG. 11 also demonstrates that it is possible to increase the size of an analysis regions without increasing the overlap between adjacent analysis regions. For example, if a pixelated lighting device is far enough from the surface so that overlap between adjacent analysis regions is not needed, the size of an analysis region may be still increased to focus the light effect more towards ambiance rather than focusing solely on the colors that are close to the side of screen where the light source is located. So, without changing the overlap, the size of the analysis region is changed such that it takes up a bigger part of the video frame without impacting adjacent analysis regions.

In the example of FIG. 11, the pixels/light sources of the lighting device have different distances to the surface. For example, a pixelated light device may lean against a wall, i.e. has an angle with respect to the wall, may be attached to the back of a curved display, or may be placed behind a display in a corner of two walls. In the example of FIG. 11, the light source associated with analysis region 151 is farthest from the surface and the light source associated with analysis region 154 is closest to the surface. The farther away the light source is from the wall, the larger effect it creates (on the wall). So, it may sometimes be beneficial to analyze a larger part of the video frame even if the distance to the wall is large such that the large effect on the wall, instead of reflecting only small part of the video frame on the side, reflects a larger part of the video frame.

Figure 12:
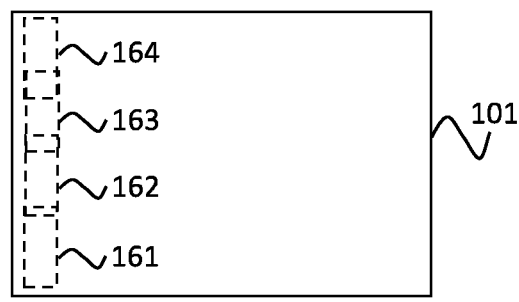

In the example of FIG. 10, each pair of adjacent analysis regions has the same overlap. However, it is also possible to use different overlaps for different pairs of adjacent analysis regions, as is shown in FIG. 12. Of the analysis regions 161-164 at the left side of the video frame, adjacent analysis regions 163 and 164 have the largest overlap and adjacent analysis regions 161 and 162 have the smallest overlap. This may be beneficial, for example, if the pixels/light sources of the lighting device have different distances to the surface.

By determining the distance to the surface for each light source individually, it becomes possible to use different overlaps for different pairs of adjacent analysis regions. In the example of FIG. 12, the light source associated with analysis region 161 is farthest from the surface and the light source associated with analysis region 164 is closest to the surface. In the example of FIG. 12, all analysis regions are of the same size but they stack on top of each other differently; the overlap area between the adjacent pixels that are farther from the wall is relatively small and the overlap area between the adjacent pixels that are closer to the wall is relatively large. Thus, only the position, and not the size, of the analysis region depends on the distance to the surface.

FIG. 12 also demonstrates that it is possible to change the overlap between two adjacent analysis areas without changing the total overlap between all analysis areas. When the angle of the pixelated lighting device with respect to the wall is increased and the distance between the light source associated with analysis region 164 is therefore increased, the overlap between adjacent analysis areas 163 and 164 may be decreased and the overlap between adjacent analysis areas 161 and 162 may be increased, thereby keeping the total overlap the same.

In the example of FIG. 12, there is still a small overlap between adjacent analysis areas 161 and 162. However, it is also possible for analysis area 161, associated with the light source farthest from the surface, not to overlap with the adjacent analysis area 162 at all. Moreover, the overlap between adjacent areas 163 and 164 may even be larger than shown in FIG. 12.

Figure 13:
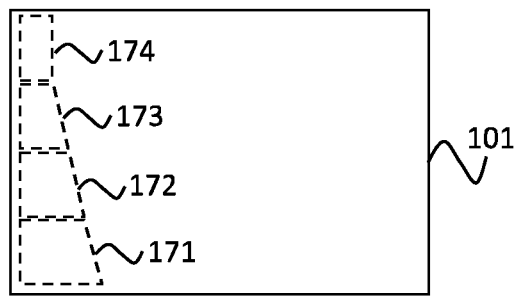

In the examples of FIGS. 9 to 12, all analysis regions have a rectangle shape. It is also possible to use a different shape or different shapes, as is shown in FIG. 13 with respect to analysis regions 171-174.

Figure 14:
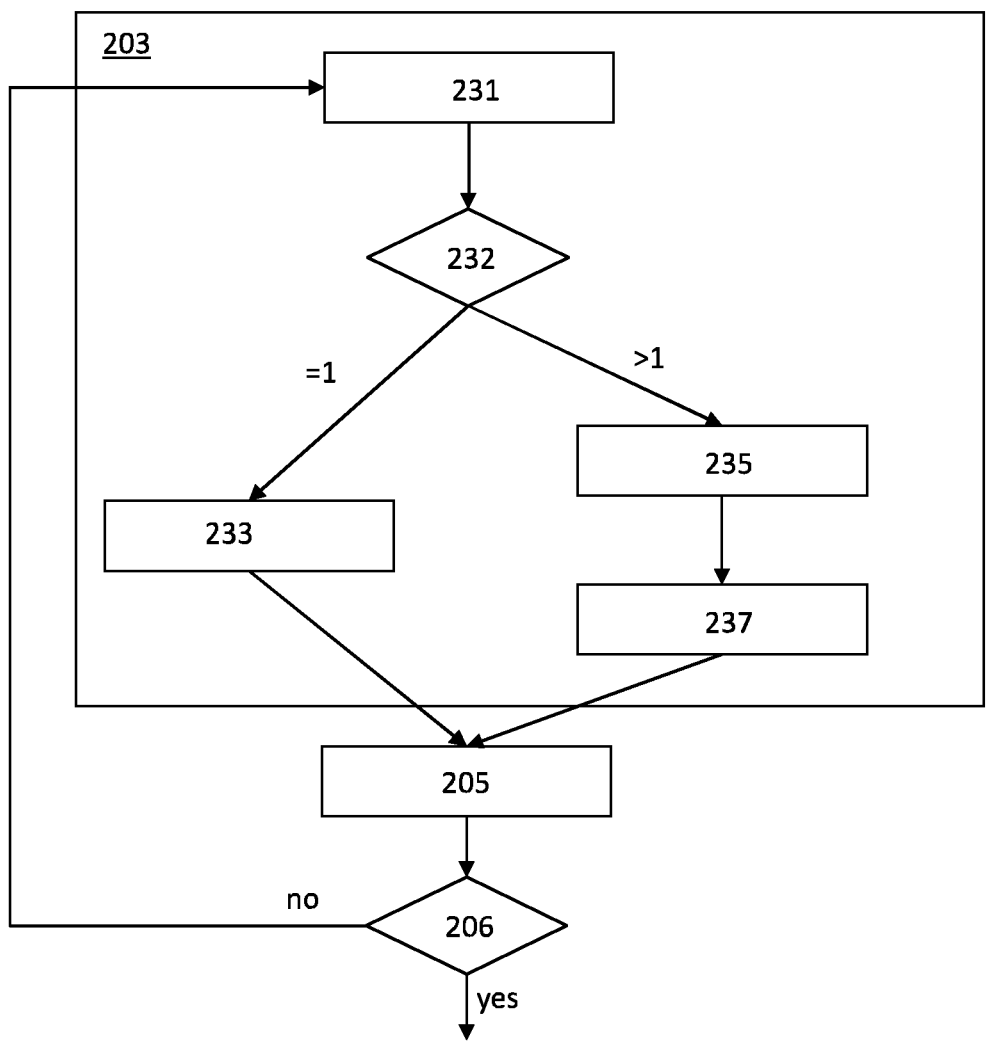
FIG. 14 is a flow diagram of a second embodiment of the method.

A part of a second embodiment of the method of controlling a light source based on an analysis of image content in an analysis region of the image content while a display displays the image content is shown in FIG. 14. In this second embodiment, step 203 of FIG. 7 is implemented by sub steps 231-241. After step 203, steps 205-212 are performed, as shown in FIG. 7.

Step 231 comprises obtaining one or more device distances between the lighting device and the surface. Typically, these one or more device distances are obtained from a sensor or from a user device, e.g. a user input device. If one end of a vertically arranged lighting device needs to lean against the wall and a device distance is obtained for the other end, then a second device distance of zero may be obtained automatically.

Next, a step 232 comprises checking whether one device distance was obtained in step 231 or whether multiple device distances were obtained in step 231. If is determined in step 232 that a single device distance was obtained in step 231, a step 233 is performed next. Step 233 comprises determining the distances between the further light sources and the surface based on the single device distance determined in step 232. Typically, the distances between the further light sources and the surface are equal to the single device distance. Step 205 is performed after step 233.

If is determined in step 232 that multiple device distances were obtained in step 231, a step 235 is performed next. Step 235 comprises calculating an average of the multiple device distances determined in step 231. If two device distances, e.g. of the two ends of the lighting device, were determined in step 231, then a single average is calculated in step 235. If more than two device distances were determined in step 231, then multiple averages may be calculated in step 235. Next, a step 237 comprises determining the distances between the further light sources and the surface based on the average(s) calculated in step 235. If a single average was calculated in step 235, the distances between the further light sources and the surface are typically equal to this single average. Step 205 is performed after step 237.

Figure 15:
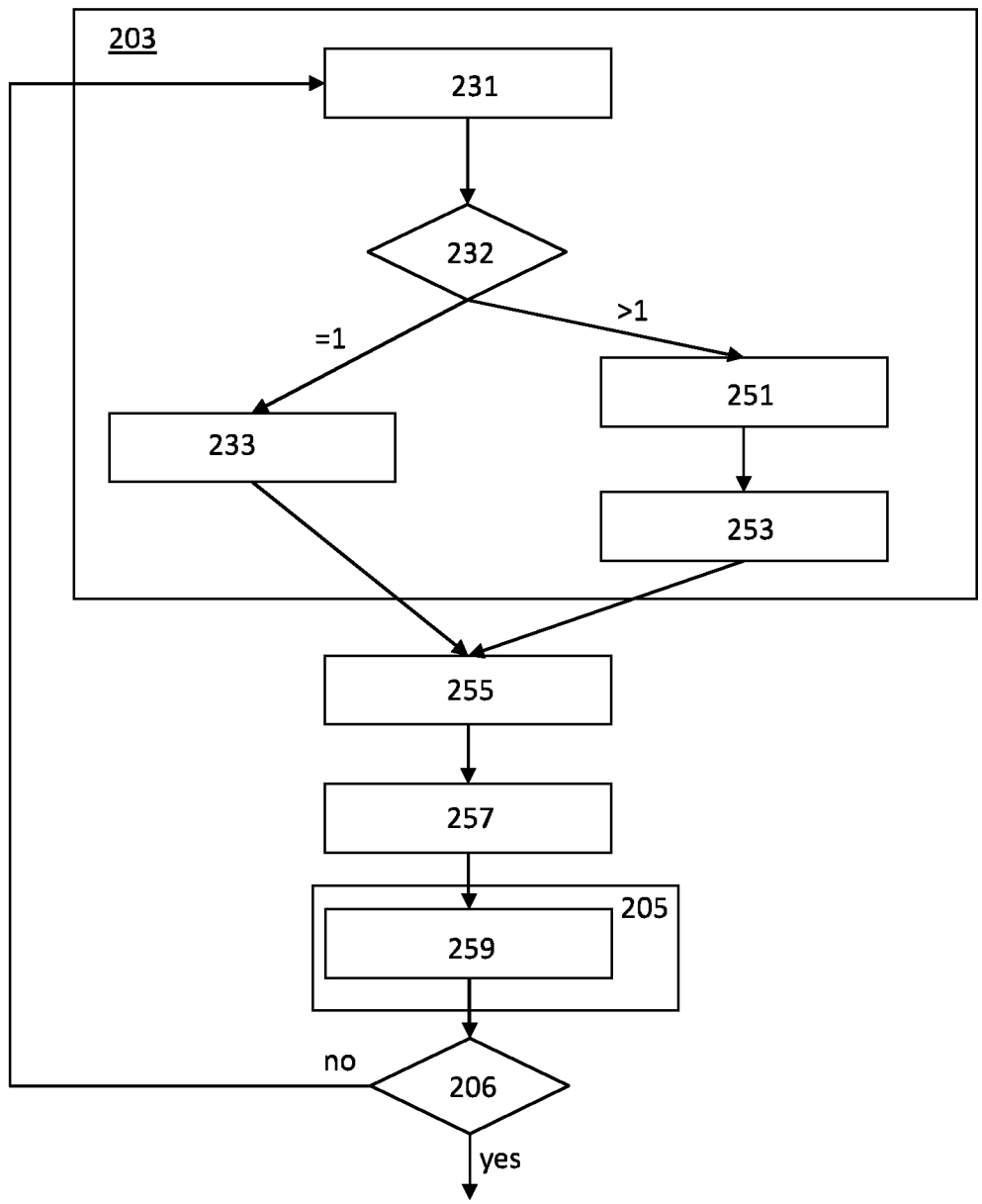
FIG. 15 is a flow diagram of a third embodiment of the method.

A part of a third embodiment of the method of controlling a light source based on an analysis of image content in an analysis region of the image content while a display displays the image content is shown in FIG. 15. Compared to the second embodiment of FIG. 14, steps 235 and 237 have been replaced with steps 251 and 253, steps 255 and 257 have been added before step 205, and step 205 is implemented by a step 259.

Step 251 comprises determining the positions of the light sources on the lighting device. Step 253 comprises determining the distance between each light source and the surface based on at least two of the device distances determined in step 231 and the position of the light source determined in step 251. The device distances are indicated with respect to a reference point on the lighting device, e.g. the edges of the lighting device. If the position of a light source is between two reference points, the distance between this light source and the surface is determined based on the two device distances corresponding to these reference points and the distances between the position of the light source and these reference points.

Step 255 comprises estimating an amount of light overlap between light projected on the surface by adjacent light sources based on the distances determined in step 203. Obtained lighting device information, see step 202 of FIG. 7, may be used to estimate the amount of overlap. For example, beam width, beam angle and distance to the wall may be used to more accurately calculate the amount of light overlap between the illumination regions of different pixels as projected on the wall. The beam width and beam angle normally have an effect on the optical mixing. For instance, more optical mixing occurs when using a wider beam and/or when the beam angle is sharper (due to the longer distance to the surface).

Step 257 comprises determining an amount of desired region overlap between the adjacent analysis regions of the adjacent light sources based on the estimated amount of light overlap. When more optical mixing occurs, the amount of desired region overlap may be lower. Step 259 comprises determining the sizes and/or locations for the analysis regions based on the amount of desired region overlap. Step 206 is performed after step 259.

Figure 16:
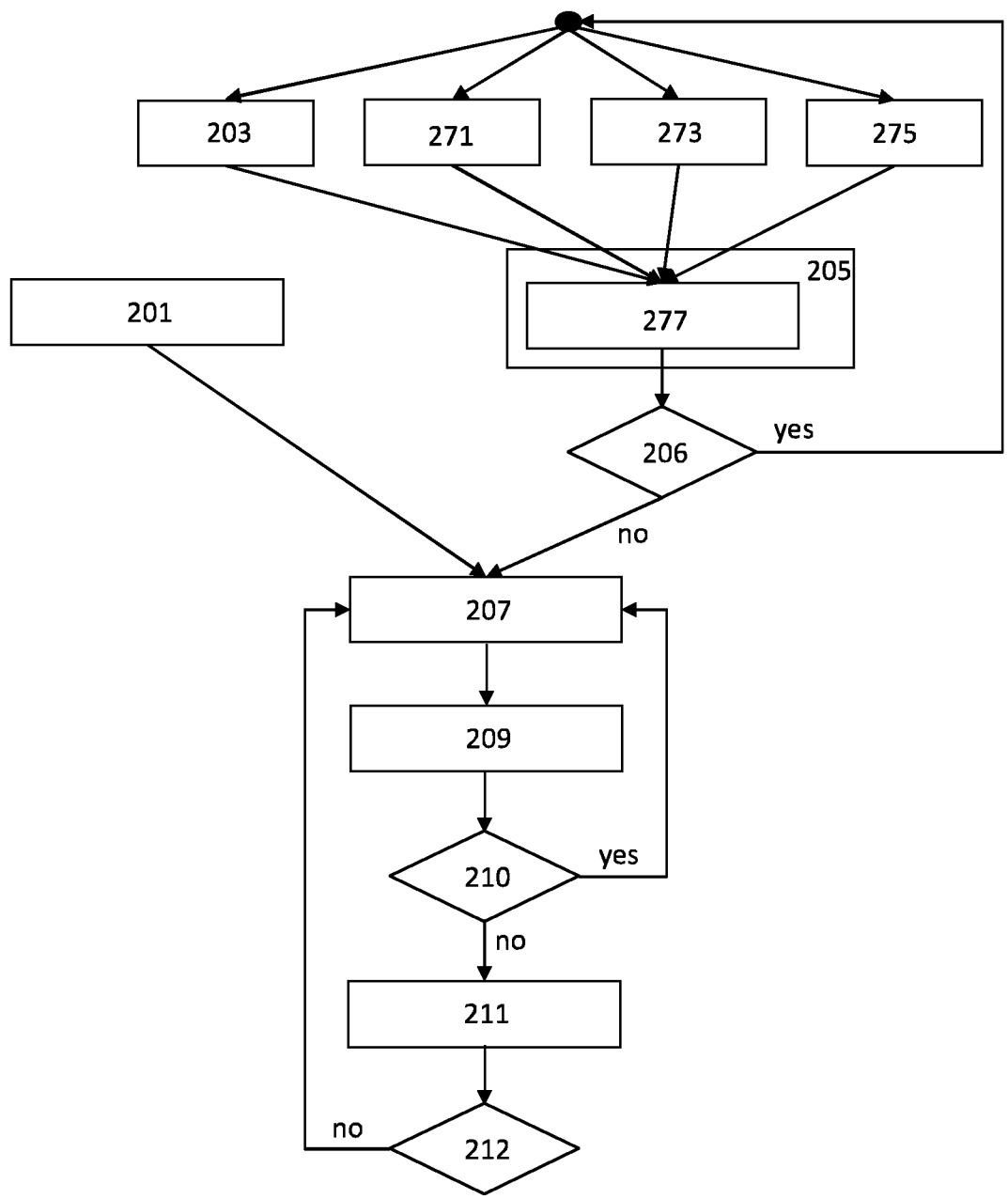
FIG. 16 is a flow diagram of a fourth embodiment of the method.

A fourth embodiment of the method of controlling a light source based on an analysis of image content in an analysis region of the image content while a display displays the image content is shown in FIG. 16. In this fourth embodiment, additional steps 271, 273 and/or 275 are optionally performed before step 205 and step 205 is implemented by a step 277.

Step 271 comprises determining the size of the light source(s) of the lighting device. Step 273 comprises determining the size of the lighting device. Step 275 comprises determining a distance between the light source(s) and the display. Step 277 comprises determining the sizes and/or locations for the analysis regions based on the distances determined in step 203 and optionally based on the size of the light source(s) of the lighting device determined in step 271, the size of the lighting device determined in step 273, and/or the distance between the light source(s) and the display. Step 206 is performed after step 277.

The embodiments of FIGS. 7 and 14 to 16 differ from each other in multiple aspects, i.e. multiple steps have been added or replaced. In variations on these embodiments, only a subset of these steps is added or replaced and/or one or more steps is omitted. For example, one or more of steps 271, 273 and 275 may be added to the embodiments of FIG. 14 and/or FIG. 15 and steps 255, 257, 259 of FIG. 15 may be added to the embodiment of FIG. 14 and/or omitted from the embodiment of FIG. 15.

Figure 17:
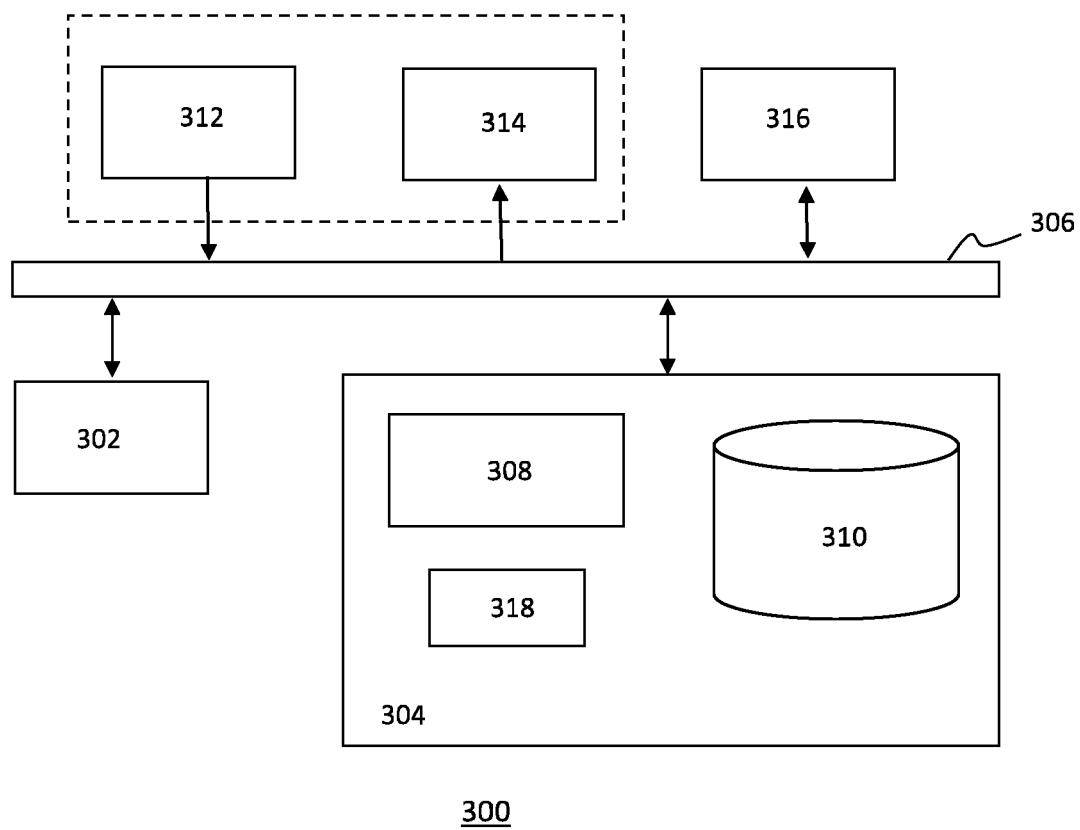
FIG. 17 is a block diagram of an exemplary data processing system for performing the method of the invention.

FIG. 17 depicts a block diagram illustrating an exemplary data processing system that may perform the method as described with reference to FIGS. 7 and 14 to 16.

As shown in FIG. 17, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 17 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 17, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 17) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for controlling a light source based on an analysis of image content in an analysis region of said image content while a display displays said image content, said system comprising:
the light source, wherein the light source is configured to project light on a surface, wherein the surface is a wall;
at least one input interface;
at least one output interface; and
at least one processor configured to:
obtain said image content via said at least one input interface,
obtain a distance between said light source and the surface from a sensor or from a user device,
determine a size and/or location for said analysis region based on said distance,
determine a characteristic of said image content by analyzing said image content in said analysis region,
determine a light effect based on said characteristic, and
control, via said at least one output interface, said light source to render said light effect onto the surface.

2. The system as claimed in claim 1, wherein said at least one processor is configured to determine a first analysis region with a first size and a first location when said distance has a first value and a second analysis region with a second size and a second location when said distance has a second value, said second size being different than said first size and/or said second location being different than said first location, said first analysis region having a larger overlap with adjacent analysis regions than said second analysis region and said first value being smaller than said second value.

3. The system as claimed in claim 2, wherein said first size is larger than said second size.

4. The system as claimed in claim 1, wherein the sensor comprises one or more infrared distance sensors and/or one or more ultrasonic distance sensors.

5. The system as claimed in claim 1, wherein said light source is comprised in a lighting device, said lighting device comprises a further light source, said distance also represents a distance between said further light source and said surface, and said at least one processor is configured to:

determine a further size and/or further location for a further analysis region of said image content based on said distance, determine a further characteristic of said image content by analyzing said image content in said further analysis region, determine a further light effect based on said further characteristic, and control said further light source to render said further light effect onto the surface.

6. The system as claimed in claim 5, wherein said at least one processor is configured to:

obtain a device distance between said lighting device and said surface, obtain a further device distance between said lighting device and said surface, and determine said distance by calculating an average of said device distance and said further device distance.

7. The system as claimed in claim 1, wherein said light source is comprised in a lighting device, said lighting device comprises a further light source, and said at least one processor is configured to:

obtain a further distance between said further light source and said surface, determine a further size and/or further location for a further analysis region of said image content based on said further distance, determine a further characteristic of said image content by analyzing said image content in said further analysis region, determine a further light effect based on said further characteristic, and control said further light source to render said further light effect onto the surface.

8. The system as claimed in claim 1, wherein the determined light effect comprises a color and/or intensity, and/or wherein the determined further light effect comprises a color and/or intensity.

9. The system as claimed in claim 5, wherein said at least one processor is configured to:

estimate an amount of light overlap between light projected on said surface by said light source and light projected on said surface by said further light source based on said distance, determine an amount of desired region overlap between said analysis region and said further analysis region based on said estimated amount of light overlap, and determine said size and/or location for said analysis region and said size and/or location for said further analysis region based on said amount of desired region overlap.

10. The system as claimed in claim 1, wherein said at least one processor is configured to determine said size and/or location for said analysis region further based on a size of said light source, a size of said display, and/or a size of a lighting device comprising said light source.

11. The system as claimed in claim 1, wherein said at least one processor is configured to determine said size and/or location for said analysis region further based on a distance between said light source and said display.

12. The system as claimed in claim 1, wherein said light source comprises a plurality of light elements, said plurality of light elements not being able to render different light effects.

13. The system as claimed in claim 4, wherein the sensor is a Time-of-Flight sensor.

14. A method of controlling a light source based on an analysis of image content in an analysis region of said image content while a display displays said image content, said method comprising:

obtaining, by a processor via at least one input interface, said image content;

obtaining, by the processor, a distance between said light source and a surface;

determining, by the processor, a size and/or location for said analysis region based on said distance;

determining, by the processor, a characteristic of said image content by analyzing said image content in said analysis region;

determining, by the processor, a light effect based on said characteristic; and controlling, by the processor via at least one output interface, said light source to render said light effect onto the surface.

* * * * *